United States Patent [19]

Appleby et al.

[11] Patent Number: 4,782,978
[45] Date of Patent: Nov. 8, 1988

[54] REMOTELY RELEASABLE FUEL FILLER DOOR WITH CONTROLLED OPENING

[75] Inventors: John M. Appleby, Wolverhampton, W. Va.; James Bolsworth, Glasgow, Great Britain; Charles M. Wilson, Westland, Mich.

[73] Assignee: General Motors Corporation, Detroit, Mich.

[21] Appl. No.: 92,761

[22] Filed: Sep. 3, 1987

[51] Int. Cl.⁴ .................................. B60J 9/00
[52] U.S. Cl. ........................... 220/335; 220/DIG. 33; 296/97.22
[58] Field of Search ........ 220/335, 334, 210, DIG.33; 296/1 C

[56] References Cited

U.S. PATENT DOCUMENTS

| 1,880,135 | 9/1932 | Heath | 220/210 X |
| 2,663,447 | 12/1953 | Westcott | 220/335 |
| 3,915,491 | 10/1975 | Montgomery | 296/1 C |
| 4,509,567 | 4/1985 | Harrison et al. | 296/1 C X |
| 4,527,825 | 7/1985 | Clouse | 296/1 C |

OTHER PUBLICATIONS

GM N-body service manual, pp. 6-4, 6-5.

Primary Examiner—Steven M. Pollard
Attorney, Agent, or Firm—Patrick M. Griffin

[57] ABSTRACT

A remotely releasable fuel filler door assembly has a limited and controlled opening motion provided by cooperating detents molded to relatively flexible spaced walls of a plastic hinge member and a plastic hinge box, so that the potential damage from an initial, wide opening is avoided.

3 Claims, 2 Drawing Sheets

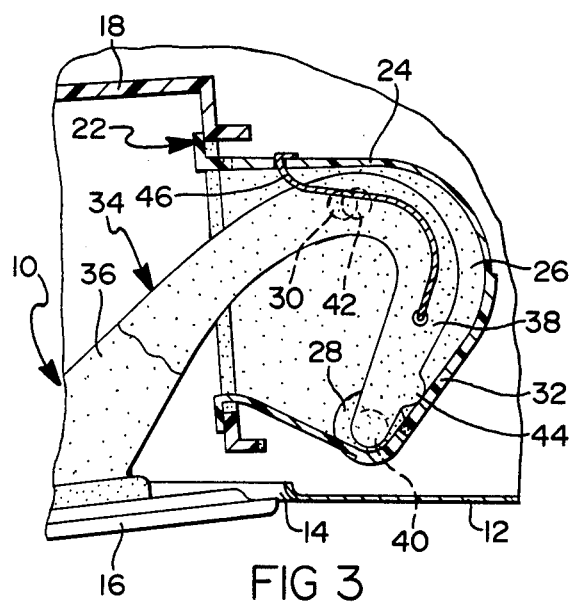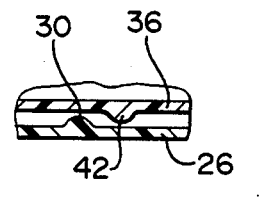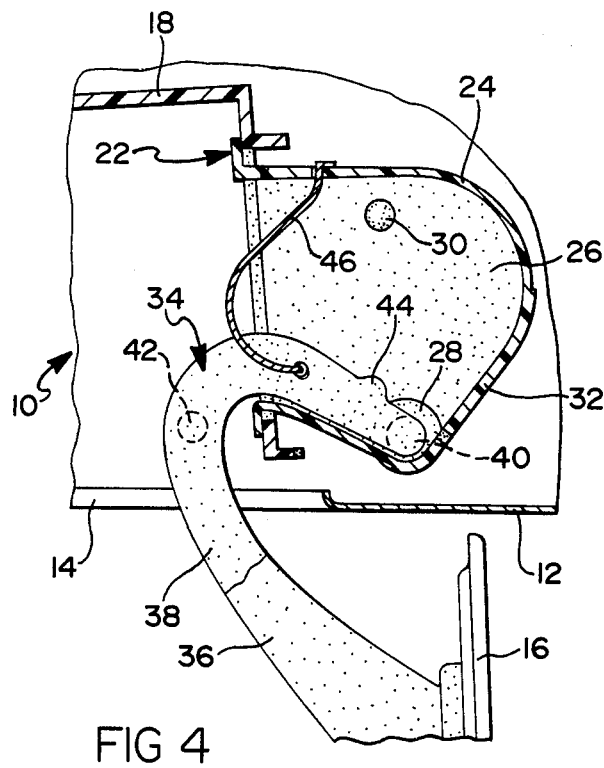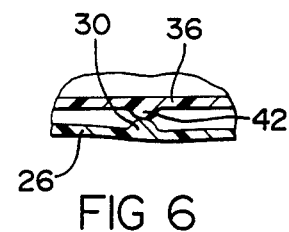

REMOTELY RELEASABLE FUEL FILLER DOOR WITH CONTROLLED OPENING

This invention relates to remotely releasable vehicle fuel filler door assemblies in general, and specifically to such an assembly that has a controlled and limited opening motion.

BACKGROUND OF THE INVENTION

Remotely releasable fuel filler door assemblies currently in use typically have a latch that is solenoid or pull wire actuated, and a leaf spring hooked between a hinge member on the filler door and the vehicle body. Consequently, when the operator releases the latch, the door pops open quickly and without any limitation, to a fully open positon where it extends out essentially perpendicular to the side of the vehicle. If the door is released while the vehicle is still moving, then the door is potentially subject to damage or being broken off. While such doors are very light and need not be strongly attached, so that their accidental breakage represents no injury potential, it would be desirable to prevent the possibility of damage to the door.

SUMMARY OF THE INVENTION

The subject invention provides a remotely releasable fuel filler door assembly that has a limited, controlled opening motion so as to avoid the above noted problem.

The preferred embodiment disclosed is used to close a fill opening in the side panel of a vehicle body, with which the door fits flush in the closed and latched position. A hinge box molded of a partially flexible and resilient plastic material has a curved end wall and a pair of upper and lower, parallel spaced walls. Each hinge box spaced wall has an integrally molded detent protrusion extending inwardly therefrom. The hinge box end wall also has a flange integrally stamped therefrom, which normally lies flush with the end wall.

The door is mounted to a hinge member which is pivotally supported within the hinge box so as that the door may swing open and shut. The hinge member is also molded of partially flexible and resilient plastic, with a pair of parallel spaced walls that fit within the hinge box spaced walls. Therefore, as the door swings, two pairs of respective walls, one of each pair on the hinge member and the other on the hinge box, move parallel to each other, with a constant clearance therebetween. Each hinge member wall has an integrally molded detent protrusion extending outwardly therefrom, which, in the closed door position, is spaced from, but extends past, the detent on the respective hinge box wall. Therefore, as the door swings open, the two pairs of respective detents blockingly engage one another to hold the door at a partially open or intermediate position. In the intermediate position, the door stands out from the body side panel just enough for an operator to insert a finger beneath the edge of the door, but not far enough to subject the door to damage. The hinge member also includes at least one extension that engages and deforms the hinge box end wall flange when the door is latched, so as to bias the door toward the open position. When the latch is released, the flange flexes back to its normal position and provides just enough force to pop the door open to the intermediate position, but not enough to flex the detents past one another. The operator may then pull the door fully open, applying enough extra force to slide the detents past one another as the respective pairs of plastic walls flex away from and back toward one another.

It is, therefore an object of the invention to provide a remotely releasable fuel filler door assembly that has a limited and controlled opening motion so as to avoid the potential damage resulting from an uncontrolled opening motion.

It is another object of the invention to provide such a controlled opening motion with flexible detents that blockingly engage one another when the door is released to maintain the door at a partially open position not subject to damage, after which the operator may pull the door open and flex the detents past one another.

It is yet another object of the invention to take advantage of the flexbility and resilience of a molded plastic hinge box and molded plastic hinge member that swings within the hinge box by providing respective spaced walls of the hinge box and hinge member with blockingly engageable detents, and by providing an end wall of the hinge box with a flange that is deformed by the hinge member when the door is fully closed, so that, when the door is released, the flange will urge the door open only until the detents engage at an intermediate open position, after which the operator can pull the partially open door and slide the detents past one another as the respective pairs of walls flex away from and back toward one another.

DESCRIPTION OF THE PREFERRED EMBODIMENT

These and other objects and features of the invention will appear from the following written description, and from the drawings, in which:

FIG. 3 is an enlarged portion of FIG. 2 showing only the intermediate, partially open position;

FIG. 4 is a view like FIG. 3, but showing the fully open position;

FIG. 5 is a sectional view taken along the line 5—5 of FIG. 2 showing the relative detent positions in the closed position;

FIG. 6 is similar to FIG. 5, but shows the relative detent positions as the door is moving from the partially open to the fully open position.

Figure 1:
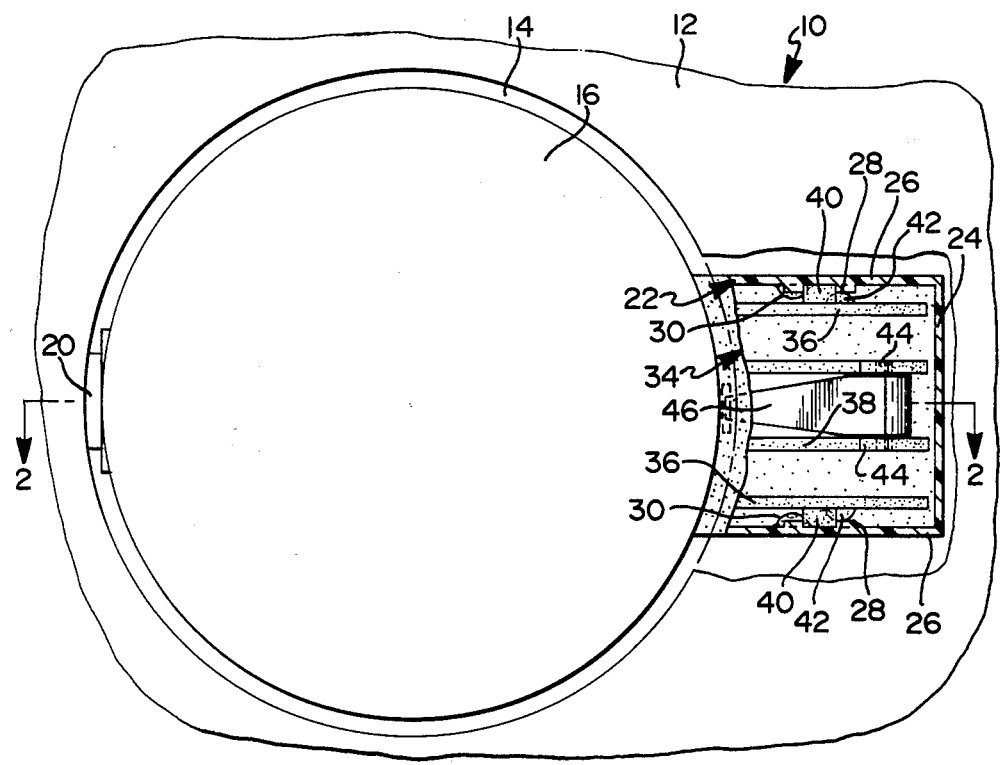
FIG. 1 is a view of a vehicle body side panel partially broken away to show detail of the hinge box and hinge member.
Figure 2:
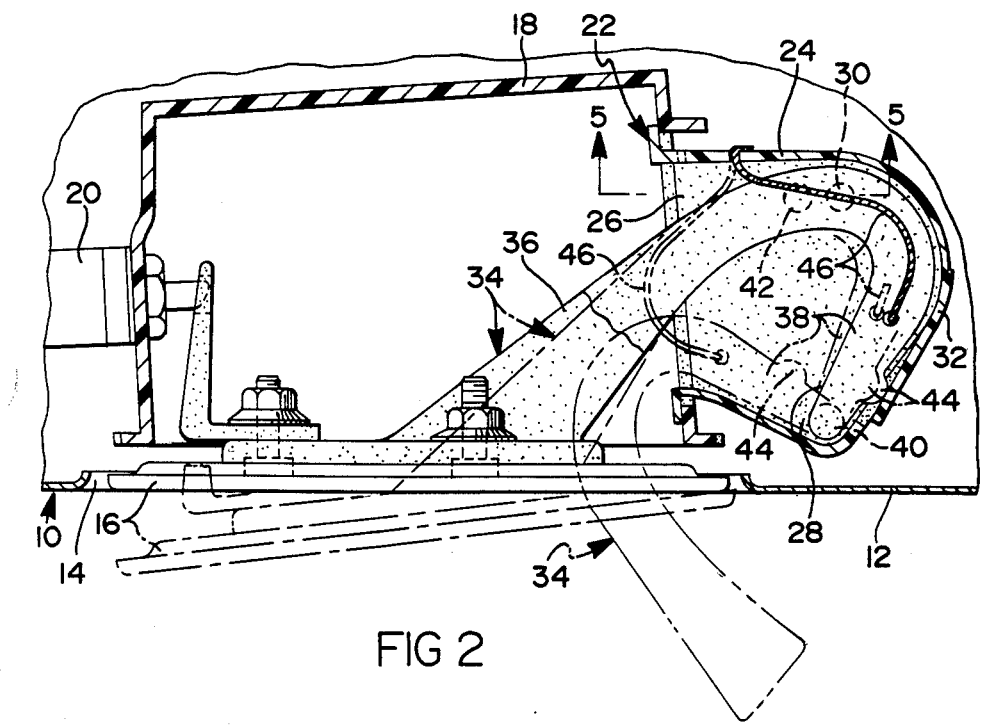
FIG. 2 is a sectional view taken along the line 2—2 of FIG. 1, showing the closed door position in solid lines, and the partially open and fully open door positions in dotted lines.

Referring first to FIGS. 1 and 2, a preferred embodiment of the fuel filler door assembly of the invention is indicated generally at 10. The preferred embodiment 10 is disclosed for use with a conventional vehicle body with a side panel 12 that has a fuel filler opening 14 defined therein. A door 16 is sized so as to fit within and cover fill opening 14, flush with side panel 12, in the closed position shown. A support box 18 that is fixed to or part of the vehicle body is inset from the filler opening 14 and mounts a remotely releasable latch 20, as well as other structure described below. Latch 20 maintains door 16 in the closed position. The invention controls and limits the opening motion of door 16 that occurs when latch 20 is released, as will be described below.

Still referring to FIGS. 1 and 2, a hinge box designated generally at 22 and molded of a flexible and resilient plastic material is attached through support box 18, effectively acting as an extension of said support box 18. Hinge box 22 has a curved, generally C shaped end wall 24 and a pair of parallel, top and bottom spaced walls 26. Each hinge box spaced wall 26 has a shallow cylindrical socket 28 integrally molded thereto, facing inwardly and opposed to the socket 28 on the other wall 26. Each wall 26 also has a detent protrusion 30 molded thereto. Each detent 30 is generally in the shape of a rounded rivet head and extends inwardly from the inside surface of its hinge box side wall 26, past the socket 28 and opposed to the other detent 30. The hinge box end wall 24 has a rectangular flange 32 integrally molded into or cut therefrom, which is free on three sides, but forms a live hinge on the fourth side. Flange 32 normally lies flush with the end wall 24, but can flex, if forced, out of the plane of end wall 24. Door 16 is pivoted to hinge box 22 by structure described next.

Referring now to FIGS. 1, 2, and 5, the door 16 is pivoted for swinging movement within hinge box 22 by a hinge member designated generally at 34. Hinge member 34 is molded of plastic as a multi-walled or multi-ribbed structure, which adds strength, including an outer pair of parallel spaced walls 36, and an inner pair 38. While hinge member 34 is, overall, more than stiff enough to swingably mount door, it will be understood that outer spaced walls 36, being plastic, do have some inherent flexibility, at least in the direction normal to the plane in which they lie. Integrally molded with the outside of the outer spaced walls 36 are a pair of outwardly extending short pins 40. To mount door 16, the hinge member outer walls 36 are interfitted closely between the hinge box spaced walls 26, and the pins 40 are snap fitted into the spaced hinge box sockets 28 to provide the hinge axis about which door 16 swings. Consequently, two respective pairs of hinge box and hinge member walls 26 and 36 are created, which move in parallel planes relative to each other in scissors like fashion, with a substantially constant clearance therebetween. Also integrally molded to the outside surfaces of the outer pair of hinge member spaced walls 36 are a pair of opposed outwardly extending detent protrusions 42 of a shape similar to the hinge box detents 30. As best seen in FIG. 5, in the fully closed position of door 16, the detents 30 and 42 form two respective pairs, which extend axially past each other, but which are circumferentially spaced from each other. Hinge member 34 has what may be referred to generally as a goose neck shape. Consequently, the edges of the walls 36 and 38 generally match the shape of, and therefore rest close to, the hinge box end wall 24, when the door 16 is closed and latched. Molded to the outside edges of the inner hinge member walls 38 are a pair of extensions 44, which deform the flange 32 out of its plane in the door latched position of FIG. 2, for a purpose described below. An over-centering hold open spring 46 stamped of flexible flat metal stock is hooked between the hinge member 34 and the hinge box 22, and is specifically located between the two hinge member inner walls 38. The intended function of spring 46 is to act as a hold open, that is, it over-centers to keep door 16 in the fully open position when the operator physically pulls door 16 fully open from the partially open position. The structure of hinge member 34 and hinge box 22 that moves door 16 to the partially open position and releasably keeps it there, and how it cooperates to do so, is described next.

Referring next to FIGS. 3, 4 and 6, when latch 20 is released, the force of the deformed hinge box end wall flange 32 acting on the hinge member extensions 44 acts to pop door 16 outwardly to the FIG. 3 position. There, the two respective pairs of detents 30 and 42 blockingly engage each other to retain door 16 at the intermediate position shown. Door 16 does not then stand out from the body side panel 12 enough to risk damage, but far enough that an operator can insert finger tips between door 16 and the adjacent part of the body side panel 12. After doing so, the operator pulls the door to the fully open position of FIG. 4, at which point the hold open spring 46 over-centers, curving out in the other direction to keep the door 16 in the fully open position. While moving from the FIG. 3 to the FIG. 4 position, the detents 30 and 42 slide past one another, a relative motion allowed by the fact that the respective pairs of walls 26 and 36, being plastic and the correct thickness to be relatively flexible, can flex away from, and then back toward, one another. FIG. 6 shows the relative position of the lower pair of respective detents 30 and 42 in the process of sliding past one another, with the walls 26 and 36 flexed relatively away from one another. It is not absolutely necessary that both walls 26 and 38 flex in the absolute sense, just that one at least flexes enough to allow enough relative flexing away from one another that the detents 30 and 42 can slide past one another. However, allowing both walls 26 and 38 to flex in the absolute sense means that neither has to flex as much, and takes particular advantage of the plastic material from which they are molded.

The preferred embodiment uses the material from which the hinge member 34 and the hinge box 22 are molded in a particularly advantageous way. The inherent flexibility and resilience of the plastic material is used to cooperatively provide several features, including the partially open position created by the cooperating molded detent pairs 30 and 42, the easy release of the door 16 from the partially open position as the walls 26 and 36 flex relative to each other, and the automatic urging of the door 16 out to the partially open position with the deformed hinge box end wall flange 32. Variations of the preferred embodiment disclosed may be made within the spirit of the invention. A resilient means, such as the flange 32, is not strictly necessary to kick door 16 out to the intermediate position, since door 16 could, for example, fall open naturally. However, a resilient means so acting is an advantage, especially the resilient means of the flange 32 and the molded extensions 44 which are conveniently molded onto and into the hinge member walls 38 and the hinge box end wall 24, taking particular advantage of the resilience of the plastic of which they are molded. Likewise, blockingly engageable and flexible detents other than those molded on the respective pairs of hinge member and hinge box walls 36 and 26 could be provided, such as ball and spring detents. However, it is particularly advantageous to integrally mold the detent protrusions 42 and 30 to the facing pairs of plastic walls 36 and 26, which takes advantage of their inherent flexibility and which allows the hinge box 22 and hinge member 34 to provide a function other than simply supporting the door 16 for swinging movement.

The embodiments of the invention in which an exclusive property or privilege is claimed are defined as follows:

1. A remotely releasable fuel filler door assembly for closing an opening in a body panel of a vehicle, said filler door assembly having a limited and controlled opening motion, comprising, a door sized so as to substantially cover said body panel opening, a hinge member fixed to said door and pivoted to said vehicle so as to mount said door to swing about a hinge axis from a closed position covering said opening and flush with said body panel to a fully open position substantially normal to said body panel, a support portion of said vehicle body relative to which said hinge member moves in a substantially parallel plane as said door swings about said hinge axis, a first positive detent member on said vehicle body support portion, and a second positive detent of said hinge member and located so as to blockingly engage said first detent when said door is remotely released to maintain said door at a partially opened intermediate position just sufficiently removed from said body panel for an operator to insert a finger between said door and body panel, with at least one of said detents being sufficiently flexible that said operator may pull on said partially opened door to flex said positive detents relative to one another and fully open said door.

2. A remotely releasable fuel filler door assembly for closing an opening in a body panel of a vehicle, said filler door assembly having a limited and controlled opening motion, comprising, a door sized so as to substantially cover said body panel opening, a hinge member fixed to said door and pivoted to said vehicle so as to mount said door to swing about a hinge axis from a closed position covering said opening and flush with said body panel to a fully open position substantially normal to said body panel, a support portion of said vehicle body relative to which said hinge member moves in a substantially parallel plane as said door swings about said hinge axis, a first flexible positive detent member on said vehicle body support portion, a second flexible positive detent of said hinge member and located so as to blockingly engage said first detent to maintain said door at a partially opened intermediate position just sufficiently removed from said body panel for an operator to insert a finger between said door and body panel, and resilient means biased between said hinge member and said vehicle to urge said door toward said open position, whereby, when said door is remotely released from said closed position it swings open only to said intermediate position, whereupon said operator may pull on said partially opened door to flex said positive detents past one another and fully open said door.

3. A remotely releasable fuel filler door assembly for closing an opening in a body panel of a vehicle, said filler door assembly having a limited and controlled opening motion, comprising, a door sized so as to substantially cover said body panel opening, a hinge box formed of a partially flexible and resilient material on said vehicle body having an end wall and a pair of generally parallel spaced side walls, a hinge member having a pair of generally parallel and side walls proximate to said hinge box side walls and pivoted to said hinge box so that said respective side walls move parallel to one another as said door swings about a hinge axis from a closed position where said hinge member is proximate said hinge box end wall and said door covers said opening flush with said body panel to a fully open position substantially normal to said body panel, a pair of first positive detents, one extending inwardly from the inside of each of said hinge box side walls, a pair of second positive detents, one extending outwardly from the outside of each of said hinge member side walls so as to blockingly engage said first detents to maintain said door at a partially opened intermediate position just sufficiently removed from said body panel for an operator to insert a finger between said door and body panel, and a flange integrally stamped from said hinge box end wall and deformed by engagement with said hinge member in said closed position so as to resiliently urge said door toward said open position, whereby, when said door is remotely released from said closed position it swings open only to said intermediate position, whereupon said operator may pull said partially opened door to the fully open position and slide said positive detents past one another as said respective pairs of walls flex relatively away from and back toward one another

* * * * *